United States Patent [19]

Tokuda et al.

[11] Patent Number: 4,897,686

[45] Date of Patent: Jan. 30, 1990

[54] PHOTOGRAPHIC PRINTING APPARATUS

[75] Inventors: Kanji Tokuda; Osamu Fukushima, both of Kanagawa, Japan

[73] Assignee: Fuji Photo Film Co., Ltd., Kanagawa, Japan

[21] Appl. No.: 252,082

[22] Filed: Sep. 30, 1988

[30] Foreign Application Priority Data

Sep. 30, 1987 [JP] Japan ................................. 62-246364

[51] Int. Cl.$^4$ ..................... G03B 27/54; G03B 27/80
[52] U.S. Cl. ......................................... 355/37; 355/68; 355/70; 355/38
[58] Field of Search ..................... 355/38, 67, 68, 70, 355/37, 69; 362/11, 13–15; 315/241 P

[56] References Cited

U.S. PATENT DOCUMENTS

| | | | |
|---|---|---|---|
| 3,782,821 | 1/1974 | Bosman | 355/70 |
| 4,551,011 | 11/1985 | Yuasa et al. | 355/37 X |
| 4,576,462 | 3/1986 | Lehman | 355/70 X |
| 4,711,569 | 12/1987 | Nishimori et al. | 355/68 X |

*Primary Examiner*—L. T. Hix
*Assistant Examiner*—D. Rutledge
*Attorney, Agent, or Firm*—Sughrue, Mion, Zinn, Macpeak & Seas

[57] ABSTRACT

A photographic printing apparatus is provided with at least two illumination lamps selectively placed in a printing path for printing an image of an original on a photographic material and a lamp detector for detecting which illumination lamp is in the printing path, and then sending a signal to a controller. The controller excites the lamp detected in the printing path and designates a data channel of a memory corresponding to the detected lamp in order to read out lamp data such as a lamp slope coefficient and lamp balance therefrom and then determine an exposure time. The lamp detector effects the detection of the lamp and generates a signal when the lamp in use is broken and is replaced with a spare.

6 Claims, 2 Drawing Sheets

PHOTOGRAPHIC PRINTING APPARATUS

BACKGROUND OF THE INVENTION

1. Field of the Invention

The present invention relates to a photographic printing apparatus and more particularly to a printing apparatus which uses a printing light source unit having a plurality of illumination lamps which are exchangeable when one of them breaks.

2. Description of the Prior Art

For better printed color balance and density, general photographic printing apparatus measures an original such as a negative film to detect light passed through the original in order to obtain the large area transmittance density of the original. The large area transmittance density is an approximate density which is expressed as the logarithm of the reciprocal of a value equivalent to the amount of light passed through the whole area of the original. According to the density of the original, the proportion of the three color components, namely red, green and blue components, of the printing light is adjusted to make an exposure with will produce a print of good color balance and density. For calculating proper exposure for each color, the following equation is conventionally used:

$$\text{Log } T_i = \text{Log } T_{Ni} + C_j (D_{Nj} - D_{NNj}) \quad (1)$$

where $T_i$: exposure time;

$T_{Ni}$: constant (exposure time for a normal density standard negative);

i: any one of red, green and blue;

$C_j$: slope control coefficient:

$D_{Nj}$: density of printing negative;

$D_{NNj}$: density of a normal density standard negative; and j: any one of cyan, magenta and yellow.

The constant $T_{Ni}$ and coefficient $C_j$ are determined upon setting printing conditions suitable for various densities of originals. In particular, the constant $T_{Ni}$ is determined depending upon an exposure time which is suitable for making a print with the most suitable gray density from standard negative having a normal density $D_{NNj}$. On the other hand, the slope control coefficient $C_j$ is determined depending upon exposure times which are suitable for under and over exposed negatives, respectively, to make prints with the same gray density as the print made from the normal density standard negative.

Conventional photographic printers have only one illumination lamp for printing negatives. Therefore, upon breakage of the illumination lamp during printing, the printing operation should be suspended in order to replace the broken illumination lamp with a new one which is usually of the same kind as the broken one. Although the two lamps are of the same kind, there is a somewhat considerable difference in optical characteristics such as luminance color between the two. The printing and condition setting, which has been made for the broken illumination lamp, has to be conducted again for the new illumination lamp. The printing condition setting is quite troublesome and time consuming because of, as was described previously, the necessity of trial prints.

SUMMARY OF THE INVENTION

It is therefore, an object of the present invention to provide a photographic printing apparatus in which illumination lamps are exchanged quickly and printing conditions are easily reset when an illumination lamp is broken, even during printing.

For accomplishing the above and other objects, the present invention provides a photographic printing apparatus which has at least two illumination lamps selectively disposed in the printing path for printing an image of an original on a photographic material. A memory is also provided having data channels, one for each of the illumination lamps for storing lamp data concerning the respective illumination lamps such as a lamp slope coefficient and lamp balance, from which printing conditions are determined. Further, the present invention provides a lamp detecting apparatus for detecting the illumination lamp in the printing path and for providing a signal, and control apparatus for exciting the detected illumination lamp in the printing path so that it emits printing light and reading out the lamp data from the data channel of the memory corresponding to the detected illumination lamp in order to determine exposure times suitable for various originals.

According to a preferred embodiment of the present invention, since a broken illumination lamp is replaced with a spare illumination lamp, and simultaneously a data channel of the memory unique to the spare illumination lamp is designated to read out the lamp data of the spare illumination lamp, it is unnecessary to conduct another printing condition setting operation for the new illumination lamp. This results in no unnecessary suspension of printing work in order to exchange illumination lamps. The exchange of illumination lamps is effected either by a manual lamp exchanging mechanism or by an automatic lamp exchanging mechanism which is simple and cheap.

BRIEF DESCRIPTION OF THE DRAWINGS

The present invention now will be described in detail with reference to the accompanying drawings, in which.

DETAILED DESCRIPTION OF THE INVENTION

Figure 1:
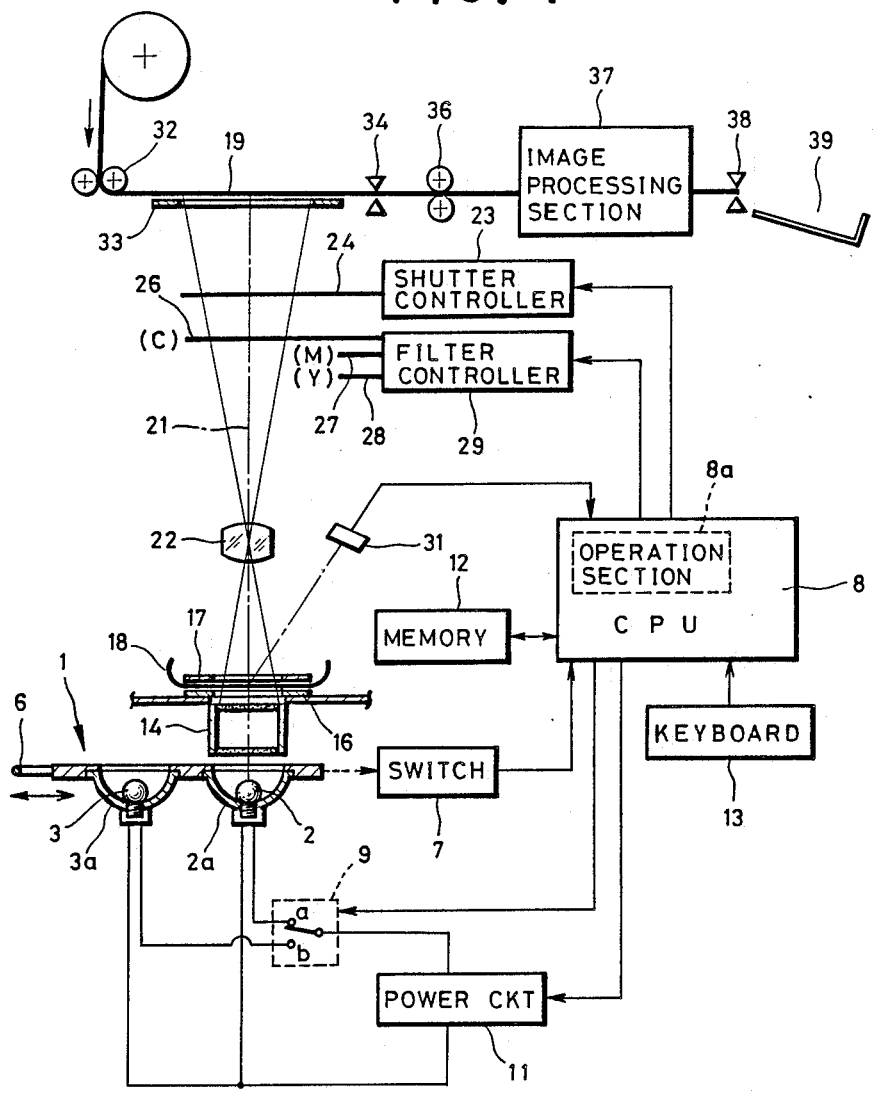
FIG. 1 is a schematic illustration showing partially in block diagram the photographic printer according to a preferred embodiment of the present invention.
Figure 2:
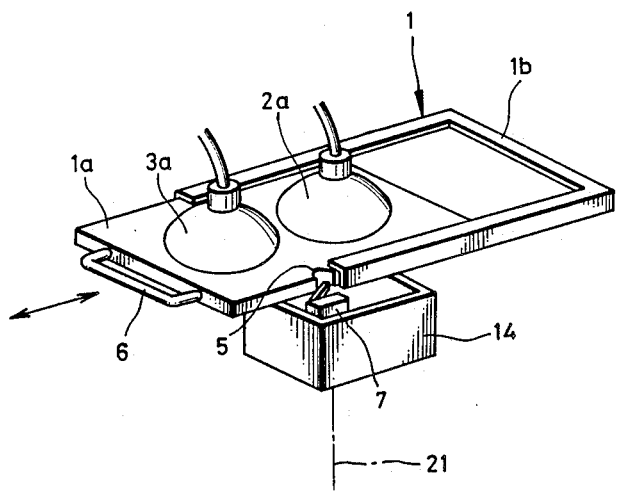
FIG. 2 is a perspective view showing an illumination lamp unit used in the photographic printer of FIG. 1.

FIG. 1 shows a photographic printer according to a preferred embodiment of the present invention. At a lower portion within the housing of the printer, there is an illumination lamp unit 1, details of which are shown in FIG. 2, which has an illumination lamp 2 that is being used and a spare or extra illumination lamp 3 with respective reflectors 2a and 3a. The illumination lamp unit 1 includes a mirror box 14 under which the illumination lamps 2 and 3 are interchangeably placed, and which comprises a square hollow tube having mirrored inner walls and top and bottom diffusion plates. The light from the illumination lamp 2 is passed into the mirror box 14 and is diffused thereby. The reflectors 2a and 3a are attached to a slidable plate 1a with a handle 6 which is slidably held in a guide frame 1b. The illumination lamp unit 1 is provided with an extra lamp detecting switch 7 which is normally in the open position and which is closed by the slidable plate 1a to provide a signal to a CPU 8 when the extra lamp 3 is placed under and in alignment with the mirror box 14. A power circuit 11 is selectively connected to the illumination lamp 2 or 3 through a relay switch 9 controlled by the CPU 8.

An operation section 8a in the CPU 8 calculates an exposure time using the following equation, taking the color balance and luminance of each illumination lamp into consideration:

$$\text{Log } T_i = \text{Log } T_{Ni} + (C_j + L_j)(D_{Nj} - D_{NNj}) + B_i \quad (2)$$

where $T_i$: exposure time;
$T_{Ni}$: constant (exposure time for a normal density standard negative):
i: one of red, green and blue;
$C_j$: slope control coefficient;
$D_{Nj}$: density of a printing negative;
$D_{NNj}$: density of the normal density standard negative;
$L_j$: lamp slope coefficient;
$B_i$: lamp balance; and
j: one of cyan, magenta and yellow.

The lamp slope coefficient $L_j$ ($L_C$, $L_M$, $L_y$) and the lamp balance $B_i$ ($B_R$, $B_G$, $B_B$) are the lamp data needed to set the printing conditions and are written in data channels of a memory 12 which correspond to respective illumination lamps. In this embodiment, there are two data channels A and B allocated to the illumination lamps 2 and 3, respectively. The remaining data $T_{Ni}$, $C_j$, $D_{NNj}$ are common to both the illumination lamps 2 and 3 and are stored in the memory 12.

A keyboard 13 having alphanumeric keys, a print key and other keys is used to enter various operational instructions into the CPU 8 and data are written in the memory 12.

The white light emanating from the illumination lamp 2 while it is in use passes into the mirror box 14 and is diffused thereby. The diffused light, after passing through a color original or color negative film 18, placed between a film carrier 16 and a framing mask 17 so it is held flat in an exposure position, is focused on color paper 19 by means of a printing lens 22. It is of course possible to print a positive image from a reversal film on reversal color paper by using an extra developing reagent.

Disposed between the color negative film 18 and the color paper 19 provided on a roll at the top of the housing of the printer, are a printing lens 22, three complementary color filters, namely cyan, magenta and yellow filters 26, 27 and 28 which are controlled by a filter controller 29, and a shutter 24 which is opened and closed by a shutter controller 23. Each color filter 26, 27, 28 is insertable into the printing path 21 independently of the other two for an exposure time calculated by the use of the equation (2) for every exposure of a frame of the color negative film 18. A light sensor unit 31 having sensors for red, green and blue is provided to detect light transmitted through the color negative film 18 for each of the three colors from which three color transmittance densities of the color negative film 18 are calculated in the operation section 8a using equation (2).

The roll of color photographic paper 19 is drawn by means of a pair of rollers 32 to be placed in an exposure position defined by a print framing mask 33. After the exposure of a predetermined number of frames, the exposed photographic paper 19 is cut off in single strips by a cutter 34 and the strips are sent to a image processing section 37 by a pair of rollers 36. In the image processing section 37, each single strip of exposed photographic paper 19 is appropriately processed, and then is cut to individual prints by a cutter 38. These prints are delivered to an external tray 39.

In the operation of the printer according to the above-described preferred embodiment of the present invention, after placing illumination lamps 2 and 3 into sockets of the reflectors 2a and 3a as a present use lamp and an extra illumination lamp, respectively, printing conditions are set for the respective illumination lamps 2 and 3, and data concerning the printing conditions are checked. Because the lamp data $L_j$ and $B_i$ are used to correct the difference in the luminance characteristic among a plurality of illumination lamps, it is convenient to select one of the plurality of illumination lamps as a specific illumination lamp and to set the lamp data of the specified illumination lamp to zero. For example, the illumination lamp 2 used first is selected as the specific illumination lamp and the lamp data $L_j$ and $B_i$ of the illumination lamp 2 are set to zero and are stored in the data channel A of the memory 12. In this case, since the exposure time equation (2) is equivalent to the conventionally used exposure time equation (1), the exposure condition setting data $T_{Ni}$ and $C_j$ are obtained by making a trial print using the specified illumination lamp 2 in the same manner as previously described.

Thereafter, the specified illumination lamp 2 is replaced with the lamp 3 and another trial print is made to obtain the lamp data $L_j$ and $B_i$ for the lamp 3. Specifically, the standard negative having a normal density $D_{NNj}$ is printed to find an exposure time $T_i$ which makes it possible to provide a print with the most desirable color balance and density. A lamp balance $B_i$ is obtained by substituting the exposure time $T_i$ data thus found, and the common data $T_{Ni}$ and $C_j$ into the exposure equation (2). An under-exposed standard negative having a density $D_{NUj}$ lower than the density $D_{NNj}$ of the normal standard negative and an over-exposed standard negative having a density $D_{NOj}$ higher than the density $D_{NNj}$ of the normal standard negative are printed separately one or more times to make trial prints in order to find the most desirable exposure time $T_i$ for a high quality print of the over-exposed and under-exposed standard negatives, respectively. The lamp data $L_j$ necessary to set the printing condition is calculated by substituting these printing condition setting data or values of $T_i$, $T_{Ni}$, $C_j$, $B_i$ and $D_{NUj}$ or $D_{NOj}$ into the equation (2).

The lamp data $L_j$ and $B_i$ are stored as the channel data A (all values are zero) for the first illumination lamp 2 and as the channel data B for the extra illumination lamp 3 in the memory 12. In order to maintain the lamp data of these illumination lamps 2 and 3 when power is shut down, it is preferable to store the printing condition setting data in an EPROM used as a part of the memory 12, or to provide the RAM of the memory 12 with backup power. The same procedures as described above are repeatedly performed to obtain lamp data $L_j$ and $B_i$ for the case where more than one extra illumination lamp is employed.

Because the extra lamp detecting switch 7 is not closed or turned on when the illumination lamp 2 is in use as shown in FIG. 2, the CPU 8 connects the relay switch 9 to the contact "a" and, on the other hand, designates the data channel A of the memory 12 and reads out the lamp data ($L_j$, $B_i$) of the illumination lamp 2 therefrom. Simultaneously, the commonly used printing condition setting data ($T_{Ni}$, $C_j$, $D_{NNj}$) are read out.

Upon operating the print key of the keyboard 13, the illumination lamp 2 is excited to emit light to its full capacity and illuminates the color negative 18. The light passing through the color negative 18 is measured by the sensor unit 31 to detect the three color components of the light passed therethrough. Based on the detected values, the CPU 8 calculates each color density $D_{Nj}$ of the color negative 18. By substituting the color density $D_{Nj}$, and the lamp data and printing condition setting data into the equation (2), the exposure time $T_i$ is calculated for each color: red, green, blue.

After the calculation of the exposure times $T_i$, the CPU 8 causes the filter controller 29 to remove the color filters 26. 27 and 28 from the printing path 21, and causes the shutter controller 23 to open the shutter 24 immediately after the removal of the color filters 26-28. Consequently, the illumination lamp 2 illuminates the color negative 18 to project an image of a frame of the color negative 18 onto the color paper 19 through the printing lens 22, thereby forming three color latent images of the projected image of the frame overlapping one another on the color paper 19. Each color filter 26, 27, 28 is controlled by the filter controller 29 to move into the printing path 21 at the appropriate exposure time $T_i$ for the corresponding color. When all the color filters 26, 27 and 28 have been fully inserted into the printing path 21 as described, the shutter controller 23 controls the shutter 24 to close thus terminating an exposure for the frame of the color negative 18. Thereafter, the color paper 19 is transported by one frame.

This operation is subsequently repeated to print a predetermined number of frames on the color paper 19. After the exposure of a predetermined number of frames, the CPU 8 actuates the cutter 34 to cut off the color paper 19 in a single strip and then activates the rollers 36 to send the strip to image processing section 37. In the image processing section 37, the single strip of exposed photographic paper 19 is appropriately processed, and then is cut to individual prints by a cutter 38. These prints are delivered to an external tray 39.

In the case where the illumination lamp 2 being used breaks, the slidable plate 1a is slid in a horizontal direction by a certain distance by pulling the handle 6 so as to replace the illumination lamp 2 with the extra illumination lamp 3. As a result of the sliding of the slidable plate 1a the extra lamp detection switch 7 is closed or turned on by the slidable plate 1a to provide a signal to the CPU 8. The CPU 8 sends a signal to the relay switch 9 and connects it to the contact "b" and, simultaneously, designates the data channel B of the memory 12 to read out the lamp data ($L_j$, $B_i$) of the illumination lamp 3 therefrom and the common printing condition setting data ($T_{Ni}$, $C_j$, $D_{NNj}$). When printing is performed using the extra illumination lamp 3, exposure times for the respective colors are obtained by substituting the lamp data and common printing condition setting data read out from the memory 12 into the equation (2).

Subsequently, if the extra illumination lamp 3 breaks, it is replaced with a second extra illumination lamp, and then trial prints are made using the second extra illumination lamp to have lamp data of the second extra illumination lamp written in the data channel A of the memory 12 via the keyboard 13 to replace the lamp data of the illumination lamp 3.

Figure 3:
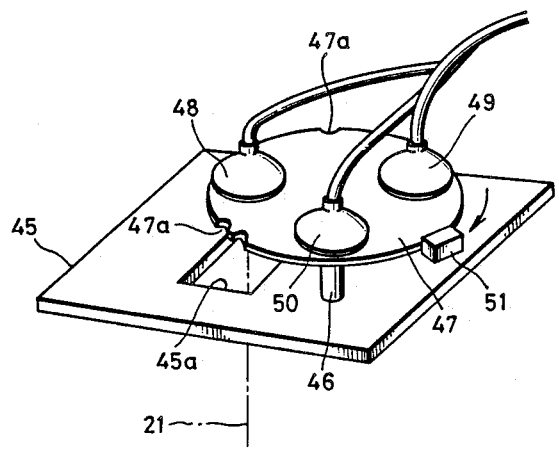
FIG. 3 is a perspective view similar to FIG. 2 showing an alternative illumination lamp unit.

FIG. 3 shows an illumination lamp unit according to another preferred embodiment of the present invention in which a turret disk is used to replace illumination lamps with one another. As shown, a turret disk 47 is pivotally supported by a pivot shaft 46 fixed to a base plate 45 for rotational movement. In FIG. 3 the turret disk 47 is provided with three illumination lamps 48, 49 and 50 at regular angular intervals and has coded notches 47a disposed on the periphery thereof corresponding to the illumination lamps 48–50. A notch sensor 51 reads these notches 47a to identify each illumination lamp in the printing path 21.

The present invention can be embodied by photographic printers of the type having complimentary color filters, namely cyan, magenta and yellow filters, displaced between the illumination lamp and the mirror box of the type having red, green and blue filters used to effect additive printing processes.

In place of the manual exchange of illumination lamps, it is desirable to provide a detector which detects a broken or defective illumination lamp to provide a signal for causing a solenoid to automatically exchange illumination lamps. In this case, the switch 7 is omitted, and upon the generation of a signal by the detector, the data channel for the extra illumination lamp is automatically selected and the extra illumination lamp is automatically turned on. It is noted that the selection of the data channel for the extra illumination lamp and the activation of the exchanged illumination lamp may be performed manually after the exchange of the illumination lamps. It is also noted that the sensor unit 31 for measuring the light passed through a frame of the negative film in the exposure position may be replaced with a sensor such as image sensor to measure an image of a frame of the negative film prior to reaching the exposure position.

Although the present invention has been fully described by way of the preferred embodiments thereof with reference to the accompanying drawings, it will be apparent to those skilled in the art that various changes and modifications of the embodiment are possible without departing from the scope of the invention.

What is claimed is:

1. A photographic printing apparatus comprising:
    an illumination lamp unit having at least two illumination lamps selectively provided in a printing path for printing an image of an original on a photographic material;
    memory means having data channels, one of said channels for each of said at least two illumination lamps for storing lamp data for a respective one of said illumination lamps, the print conditions of said photographic printing apparatus being adjusted based on said lamp data;
    detecting means for detecting which one of said at least two illumination lamps is provided in such printing path and generating a signal corresponding to the result of said detection; and
    control means for exciting said detected illumination lamp in said printing path to emit printing light, and reading out said lamp data from said data channel of said memory means corresponding to said detected illumination lamp.

2. A photographic printing apparatus as claimed in claim 1, wherein said lamp data for one of said at least two illumination lamps includes exposure times for each of three primary colors and slope coefficients for each of three complimentary colors, which are suitably determined to make a well finished print from a standard original having a normal density when said lamp slope coefficient for each complimentary color and a lamp balance for each primary color are set to zero; and wherein the lamp data for the remaining illuminating lamps includes the slope coefficient for each primary color and a lamp balance for each complimentary color which are determined so as to result in substantially the same print as said well finished print made from said standard original by using one of said at least two illumination lamps.

3. A photographic printing apparatus comprising:

an illumination lamp unit having at least two illumination lamps selectively provided in a printing path for printing an image of an original on a photographic material;

memory means having data channels, one of said channels for each of said at least two illumination lamps for storing lamp data for a respective one of said illumination lamps, the print conditions of said photographic printing apparatus being adjusted based on said lamp data;

detecting means for detecting which one of said at least two illumination lamps is provided in such printing path and generating a signal corresponding to the result of said detection; and control means for exciting said detected illumination lamp in said printing path to emit printing light, and reading out said lamp data from said data channel of said memory means corresponding to said detected illumination lamp, wherein said at least two illumination lamps are disposed on a plate slidable in a direction perpendicular to said printing path.

4. A photographic printing apparatus comprising:

an illumination lamp unit having at least two illumination lamps selectively provided in a printing path for printing an image of an original on a photographic material;

memory means having data channels, one of said channels for each of said at least two illumination lamps for storing lamp data for a respective one of said illumination lamps, the print conditions of said photographic printing apparatus being adjusted based on said lamp data;

detecting means for detecting which one of said at least two illumination lamps is provided in such printing path and generating a signal corresponding to the result of said detection; and control means for exciting said detected illumination lamp in said printing path to emit printing light, and reading out said lamp data from said data channel of said memory means corresponding to said detected illumination lamp, wherein said at least two illumination lamps are disposed on a turret truntable in a plane perpendicular to said printing path.

5. A photographic printing apparatus comprising:

an illumination lamp unit having at least two illumination lamps selectively provided in a printing path for printing an image of an original on a photographic material;

memory means having data channels, one of said channels for each of said at least two illumination lamps for storing lamp data for a respective one of said illumination lamps, the print conditions of said photographic printing apparatus being adjusted based on said lamp data;

detecting means for detecting which one of said at least two illumination lamps is provided in such printing path and generating a signal corresponding to the result of said detection;

control means for exciting said detected illumination lamp in said printing path to emit printing light, and reading out said lamp data from said data channel of said memory means corresponding to said detected illumination lamp; and a lamp detector for detecting whether said illumination lamp provided in said printing path is broken or defective, and generating a signal by which said illumination lamp unit automatically replaces said broken illumination lamp with another one of said at least two illumination lamps, into said printing path.

6. A photographic printing apparatus as claimed in claim 5, wherein said control means receives said signal generated by said lamp detector and reads out said lamp data channel corresponduing to said another one of said at least two illumination lamps.

* * * * *